March 31, 1936.  L. DAUM  2,036,126
AMMUNITION SUPPLYING DEVICE FOR PAIRS OF GUNS MOUNTED IN TURRETS OR THE LIKE
Filed May 15, 1935  8 Sheets-Sheet 5

Inventor
Leon Daum
By
Cameron, Kerkam & Sutton
Attorneys

March 31, 1936.  L. DAUM  2,036,126
AMMUNITION SUPPLYING DEVICE FOR PAIRS OF GUNS MOUNTED IN TURRETS OR THE LIKE
Filed May 15, 1935  8 Sheets-Sheet 8

Inventor.
Leon Daum
By
Cameron, Kerkam + Sutton
Attorneys

Patented Mar. 31, 1936 2,036,126

UNITED STATES PATENT OFFICE 2,036,126

AMMUNITION SUPPLYING DEVICE FOR PAIRS OF GUNS MOUNTED IN TURRETS OR THE LIKE

Léon Daum, Paris, France, assignor of one-half to Schneider & Cie, a company of France, and one-half to Compagnie des Forges et Acieries de la Marine et d'Homecourt, a company of France, both of Paris, France Application May 15, 1935, Serial No. 21,670
In France March 4, 1935

12 Claims. (Cl. 89—45)

This invention relates to ammunition supplying devices, and more particularly to mechanisms of this character adapted for use with twin gun mounts.

In the ammunition supplying device described and shown in my Patent No. 2,004,855, dated June 11, 1935, and also in that described and shown in my Patent No. 2,004,856, the maximum angle of elevation of the gun for which it is possible to bring the ammunition receiving sockets of the swivelling frame and the loading device fixed to the cradle into alignment for loading is limited by abutment of the elements carried by the cradle and forming a conduit to the loading device against the swivelling frame or the hoists.

This limitation in elevation is a disadvantage in the case of guns intended for firing against aircraft, in view of the fact that in practice it does not permit the guns to be fired up to an angle of elevation in the vicinity of 90°.

The new arrangement described hereinafter for the swivelling frame and its receiving sockets renders it possible, on the contrary, to fire shots under such conditions.

In the accompanying drawings, which show by way of example the application of the invention to associated guns mounted in a turret.

Figures 9, 9a, 10 and 11 show a second embodiment of the ammunition receiving device at the top of the hoist, this form of construction being applicable to a hoist raising simultaneously four rounds of fixed ammunition or two rounds of ammunition of the type in which the projectile and propelling charge are separate, Figures 9 and 9a being sectional elevations similar to those of Figures 4 and 4a, Figure 10 a view similar to that of Figure 5 and Figure 11 a sectional plan along the line XI—XI of Figure 9.

Figure 1:
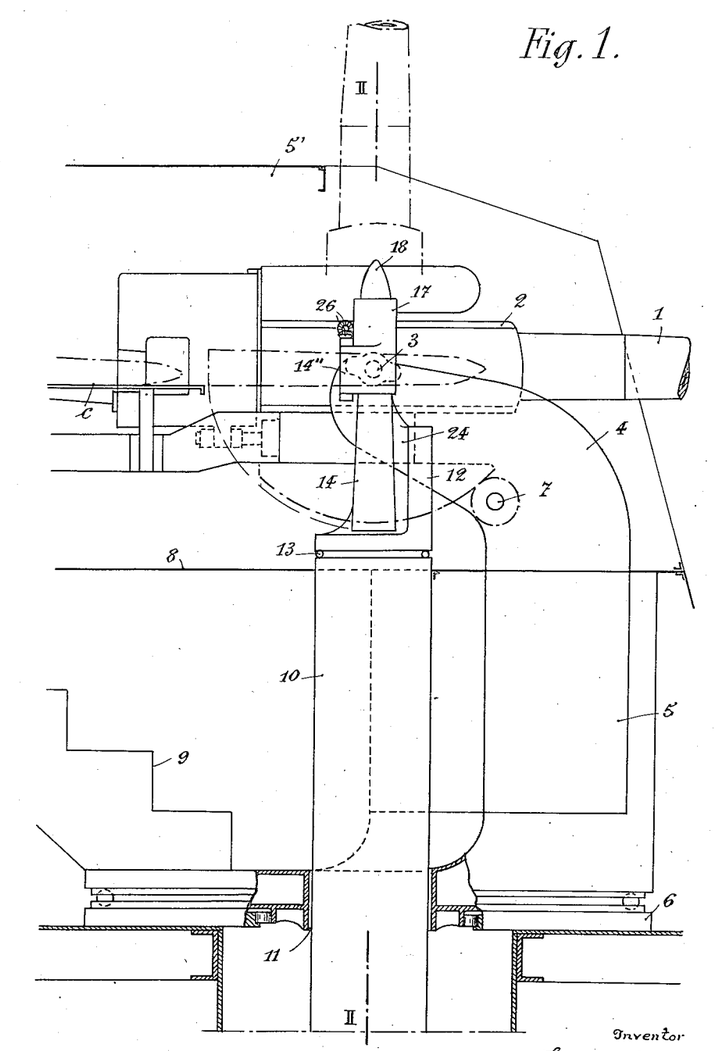
Figure 1 is a longitudinal sectional elevation of the whole of the turret along a vertical axial plane parallel to the axes of the guns.
Figure 2:
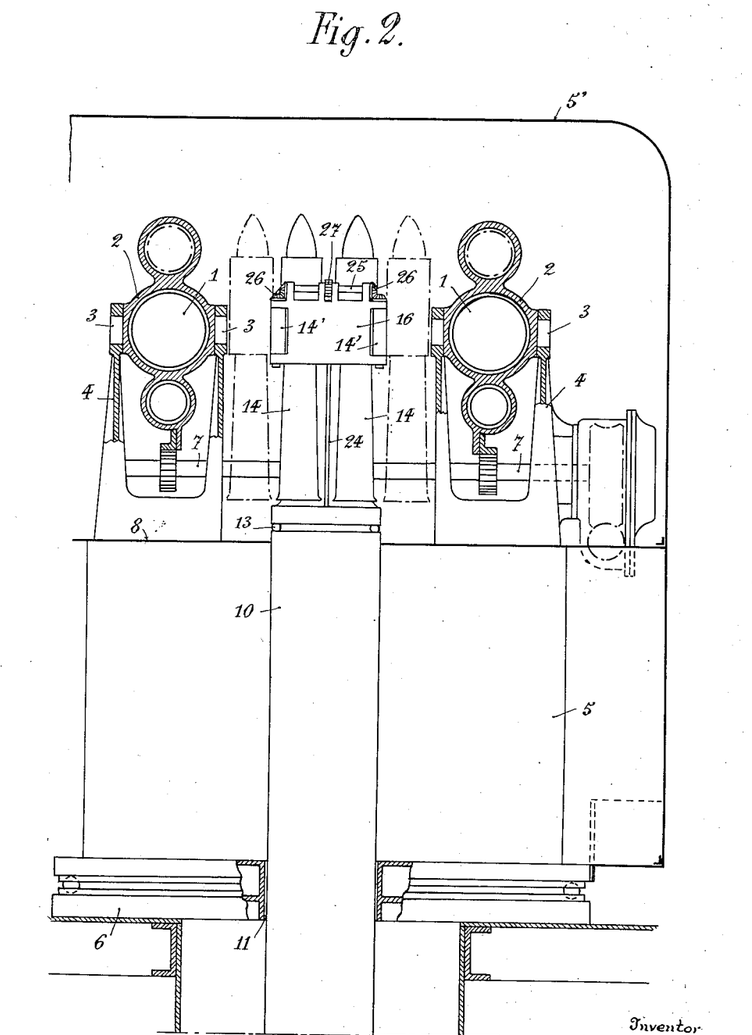
Figure 2 is a cross section through the axis of rotation of the turret along the line II—II of Figure 1.
Figure 3:
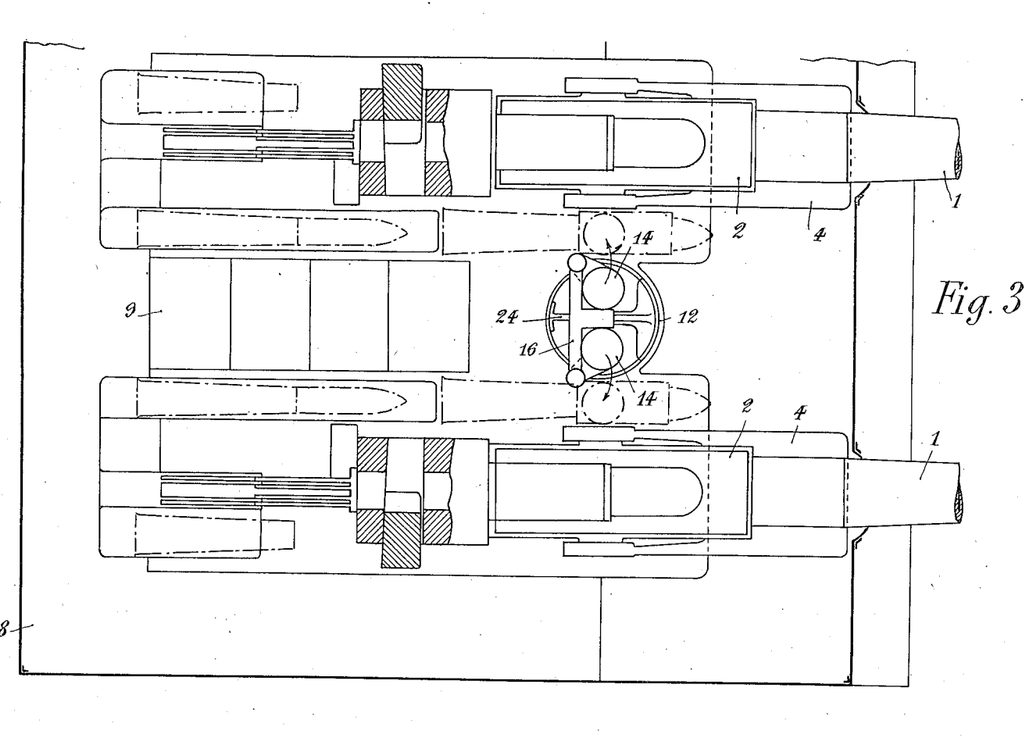
Figure 3 is a plan view corresponding to Figure 1 with certain parts shown in section.

In Figures 1, 2 and 3, 1 denotes the guns carried in the known manner by the cradles 2 the said cradles resting by means of their trunnions 3 on mountings or cradle supports 4.

The usual firing members and loading devices are supported on each of the cradles in the known manner and as in the construction disclosed in my Patent No. 2,004,855.

The cradle supports 4 in the embodiment shown are carried by a rotatable platform 5 which is mounted on a fixed bearing 6 by means of a rolling and centering track.

For aiming in elevation, the two cradles may be, for example, connected with a single aiming shaft 7.

The platform 5 may support a shield 5' forming a firing chamber, an operating floor 8 and steps 9 for facilitating the loading operations at high angles of elevation.

The part of the device forming the ammunition receiving apparatus is arranged as in the constructions disclosed in Patents Nos. 2,004,855 and 2,004,856 along the vertical axis of rotation of the turret, between the two guns and opposite the mouth of the trunk of a fixed central hoist 10. This hoist extends through an aperture 11 provided in the centre of the platform 5.

The actual ammunition hoist may be of any known type with a reciprocating hoisting mechanism, and may be constructed like that shown in Patent No. 2,004,855.

The ammunition receiving element of the first embodiment of the present invention is shown in detail in Figures 4 to 8.

As in the construction of Patent No. 2,004,855 this apparatus comprises a kind of open sided frame 12 adapted to rotate or swivel about its vertical geometric axis which is at the same time the axis common to the turret and to the central hoist 10. The centering of the said swivelling frame is ensured, at its base, by a ball-bearing 13 or by any other equivalent device.

According to the invention, the ammunition receiving sockets 14 are arranged in such a manner that they can be brought outside of the confines of the swivelling frame 12 by a lateral movement before they are pivoted relatively to the latter about a horizontal axis for placing them at the inclination selected for the guns, the latter being spaced laterally away from the frame at the desired distance for the inclusion of the said sockets between them and the frame.

In the embodiment illustrated in Figures 4-8, the bringing of the sockets out of the swivelling frame is effected as follows:

The socket carrier is constituted by a support 16 normally vertical and carrying forwardly projecting side plates 16', which, by means of a horizontal pin 23, are adapted to rotate in vertical plane in the disc-shaped head 24' of an upright 24 in the form of a centrally disposed internal projection or rib formed on the casing 12 of the frame.

Each of sockets 14 has mounted on the upper end thereof a spring box 17 in which is housed a movable ogival shaped cap 18 adapted to be raised by the ammunition at the completion of the introduction of the latter into the socket. The cap, on being raised, compresses a spring 19, the object of which is subsequently to expel the ammunition from the socket and move it towards one of the conduits or trays c carried by the cradles. Mounted on the lower part of each socket 14 is a retractable pawl or catch 20 rotatable on a pin 21 and constantly urged into a retaining position below the ammunition by a torsion spring 22.

The support 16 is, as previously pointed out, pivotally mounted on a horizontal pin 23 carried by the vertical central rib 24 of the frame 12. For loading, the pin 23 is brought into coincidence with the geometric axis common to the trunnions 3 of the cradles 2 by rotation of frame 12.

Figure 6:
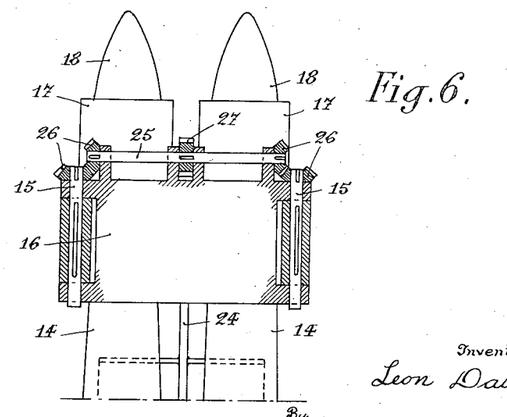
Figure 7:
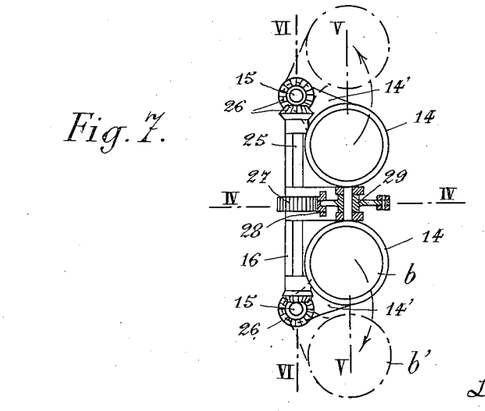
Figure 8:
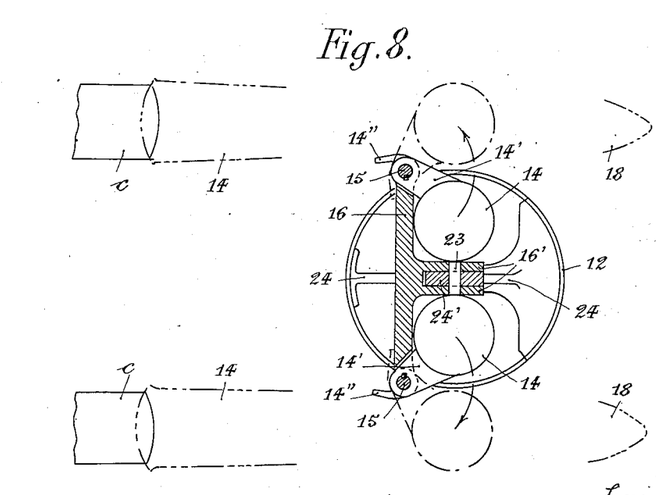

Each socket 14 is provided with an arm 14' which is keyed to a pin or stub shaft 15 lying parallel to the longitudinal axis of the socket, said shafts being journalled in suitable bearings formed in support 16. Both of shafts 15 are connected to a horizontal shaft 25 by means of bevel pinions 26 (Figure 6). Keyed on the shaft 25 is a pinion 27 meshing with a vertical rack 28 which is movable in a suitable guide formed in support 16 by means of an operating lever 29 and rocking lever 34.

The frame 12 of the apparatus which has just been described is swivelled and supplied with ammunition in the same manner as the corresponding element of the apparatus disclosed in Patent No. 2,004,855. Before the operation of tilting the sockets 14, however, for bringing the latter to the loading angle of the conduits or trays c and other loading devices of the guns, it is necessary to cause the said sockets to pivot simultaneously about the axes of shafts or pins 15 in order to bring them out of the frame 12 and into the positions indicated in chain lines in Figures 2, 3, 5, 7 and 8, corresponding to the vertical planes passing through the axes of the said conduits or trays and loading devices. This pivoting is effected by the attendant operating the lever 29 which he brings from the position a into the position a' (Figure 4).

The outward movement of the sockets is limited by the abutment with the rear external face of the support 16 of lugs or arms 14'' which are formed integrally with and extend outwardly from the arms 14' by which the said sockets are mounted on the pins 15.

Figure 4:
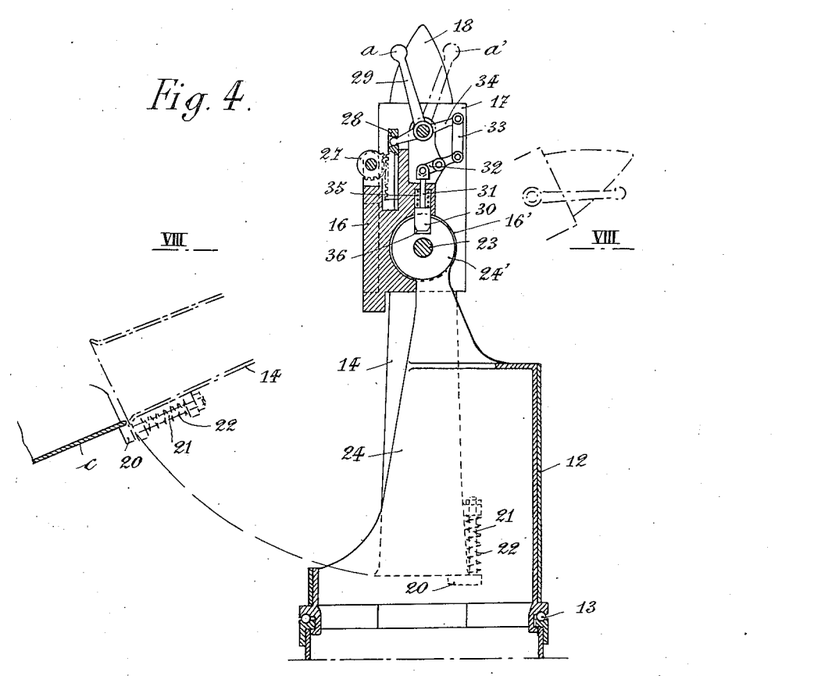
Figures 4, 4a, 5, 6, 7 and 8 show in detail and on a larger scale than Figures 1-3 one embodiment of the present invention in which the ammunition is received on leaving the hoist, Figures 4 and 4a being sectional elevations along the line IV—IV of Figure 7, Figure 5 a section along the line V—V of Figure 7, Figure 6 a section along the line VI—VI of Figure 7, Figure 7 a plan view corresponding to Figure 4 and Figure 8 a sectional plan along the line VIII—VIII of Figure 4.
Figure 4A:
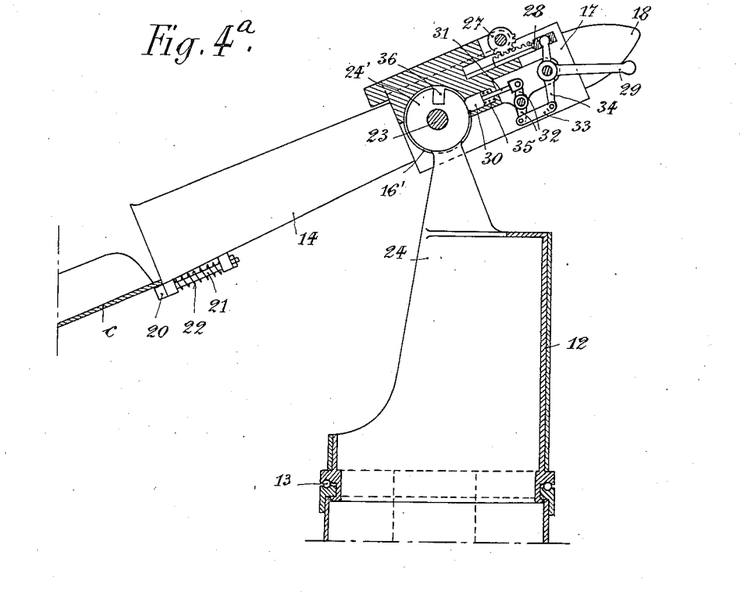

The consecutive operations of the removal of the sockets 14 out of the frame 12 followed by the tilting of the said sockets about the pin 23 for bringing them into alignment with the conduits or trays of the cradle are rendered possible by a locking device clearly shown in Figures 4 and 4a.

This device comprises a bolt 30 (Figures 4, 4a, 5) slidable in a suitable recess formed in support 16 and connected by a rod 31 to one of the arms of a double lever 32, the other arm of which is connected by a rod 33 to a rocking lever 34 integral with the operating lever 29.

Figure 5:
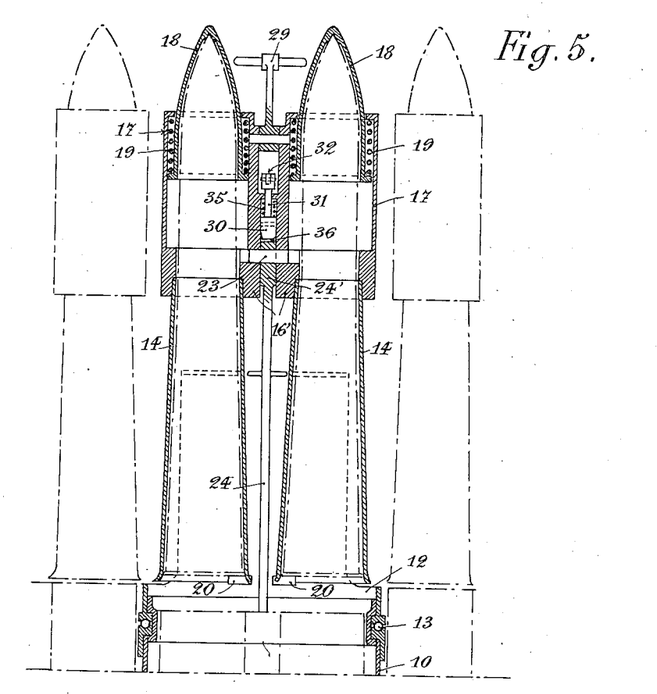

The bolt 30 is urged by a spring 35 to engage a recess 36 provided in the disc 24' carrying the hinge pin 23.

In the normal vertical position of the sockets, in which the latter are vertically in line with the hoists 10, the bolt 30 is engaged in its recess when the lever 29 is in the position a (Figure 4).

During the operation of the lever 29 from a to a', corresponding to the removal of the sockets out of the frame, the bolt 30 is raised but remains engaged in its recess until the sockets reach the limit of their outward movement. It follows that the action of the lever 29 in moving from a to a' can cause only lateral movement of the sockets out of frame 12, tilting or pivoting of support 16 and sockets 14 about the pin 23 being possible only after the complete disengagement of the bolt 30 from the recess 36.

During the whole of the time of the tilting about the pin 23, the bolt 30 remains in contact with the periphery of disc 24' (Figure 4a), thereby preventing any movement of rack 28 and pinion 27 which might produce inward movement of sockets 14 toward their normal positions within frame 12.

After the return of the sockets into the vertical position by movement about the axis of pin 23, the bolt 30 again comes opposite the recess 36, which permits operation of the lever 29 from a' to a and consequent return of the sockets 14 into line with the hoists 10. The whole device is then fixed on the support 24 for the introduction of the next round of ammunition into the sockets.

A second form of construction of the invention is shown in Figures 9, 9a, 10 and 11, this embodiment being applicable to an apparatus for receiving four rounds of ammunition, each formed of a single element, such as for example four cartridges, that is two per gun, or to an apparatus adapted to receive two rounds of ammunition, each in two elements, as in the case of the apparatus described in Patent No. 2,004,856.

In the specific construction shown, the case of four cartridges has been considered.

The apparatus shown comprises four sockets 14 having a spring box 17, 18, 19 and retractable catch 20, all similar to the first embodiment illustrated in Figures 1–8.

Figure 9:
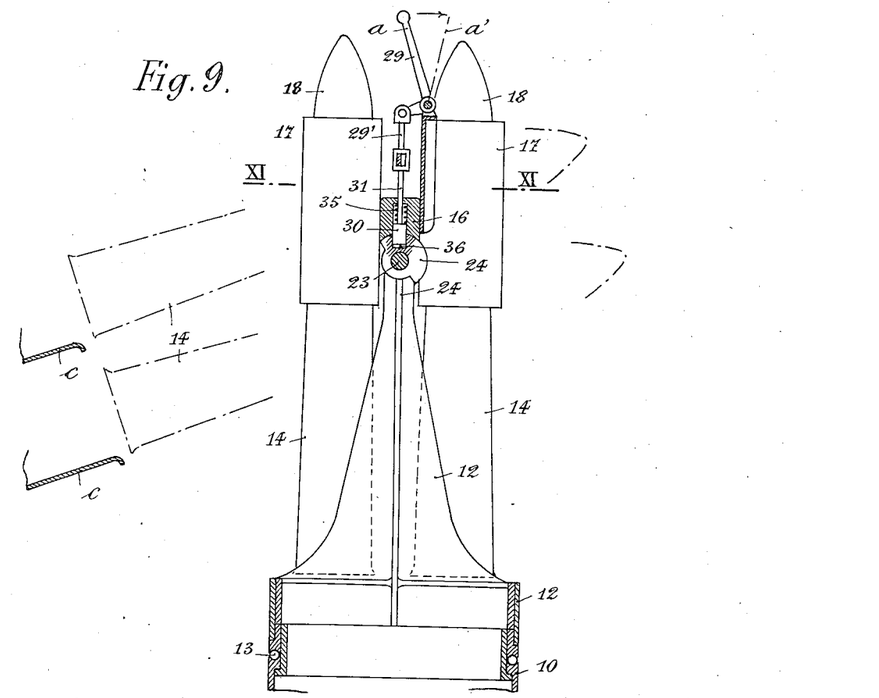
Figure 9A:
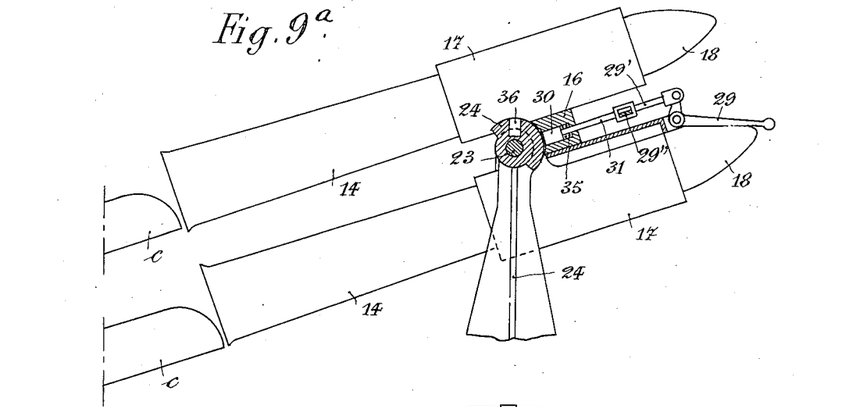
Figure 10:
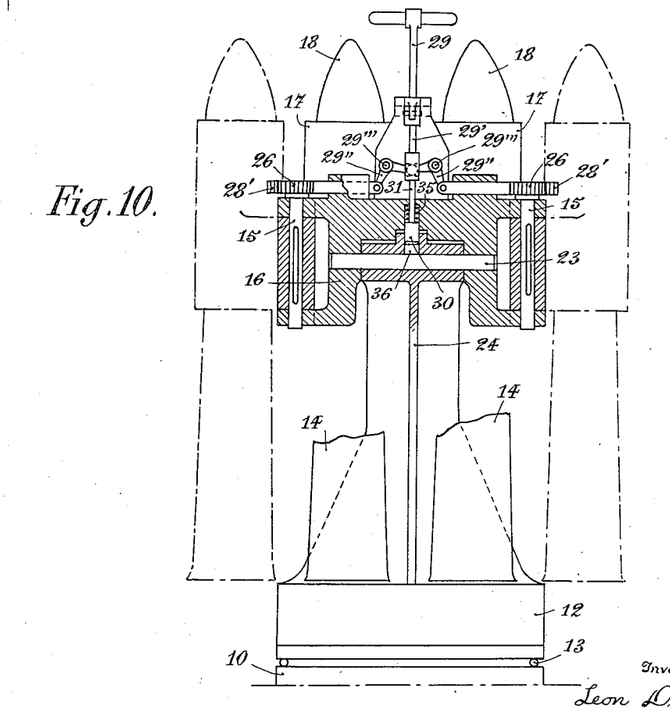
Figure 11:
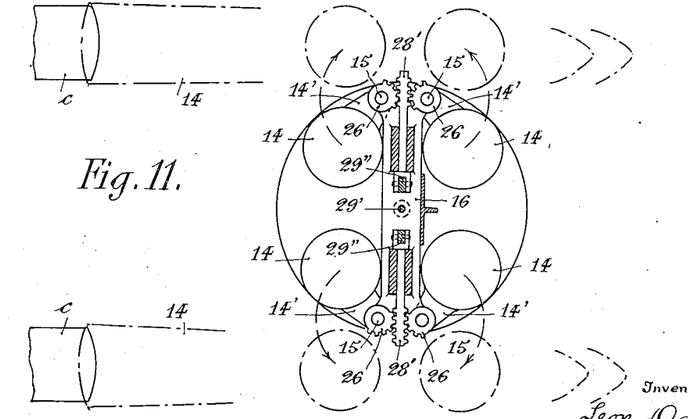

Each of the said sockets is secured to a vertical hinge pin 15. The four pins 15 are mounted symmetrically in pairs on the ends of a brace member or support 16. The latter is itself pivoted by means of a pin 23 to a support 24 integral with the frame 12. For loading operations, the pin 23 is brought into coincidence with the axis common to the trunnions 3 of the cradles 2, it being understood that the apparatus of Figures 9–11 is mounted in the turret and cooperates with the guns in the same manner as is indicated in Figures 1–3 for the ammunition receiving mechanism for Figures 4–8.

The hinge pins 15 are connected in pairs to horizontal double racks 28' by means of pinions 26 keyed to the said pins 15. The two racks 28' are operated simultaneously by one lever 29 through the medium of a rod 29' and two bell-cranks 29'' pivoted to fixed points 29''' and actuating the racks 28'.

The four-socket apparatus likewise comprises a locking device which ensures the sequence, in a predetermined order, of the operations of pivoting the sockets about their pins 15 and tilting of the entire oscillating system about the pin 23.

This device comprises a bolt 30 (Figures 9, 9a, 10) connected by the rods 31 and 29' to the lever 29.

The bolt 30 is urged by a spring 35 to engage a recess 36 provided in a hub or boss 24 having the same axis as the pivot 23 and carried by the support 24.

In the normal vertical position of the sockets, the bolt 30 is engaged in its recess 36 (Figure 9).

During the operation of the lever 29 from *a* to *a'* for causing the sockets to move apart, the bolt 30 is raised but remains engaged in its recess until the end of the outward movement of the said sockets. Consequently, operation of the lever 29 to move it from *a* to *a'* can cause only the outward movement of the sockets, the tilting of the system about the pin 23 being possible only after the bolt 30 has been completely disengaged from the recess 36.

During the whole of the time of the tilting about the pin 23, the bolt 30 remains in contact with the hub 24 of the support 24 (Figure 9a), so that the action of the attendant on the lever 29 cannot on the return cause any movement other than that of tilting about the pin 23.

After the return of the sockets into the vertical position, the bolt 30 is again opposite its recess 36, whereby the sockets can be returned into line with the hoists by the continuous return operation of the lever 29 from *a'* to *a*. The entire apparatus is then fixed on the support 24 for the introduction of the next round of ammunition into the sockets.

Although two specific forms of mechanism have been described and illustrated in some detail, it will be obvious that the invention is not limited to the apparatus shown in the drawings but is capable of a variety of mechanical embodiments. Various changes, which will now become apparent to those skilled in the art, may be made in the form, details of construction and arrangement of the parts without departing from the spirit of the invention. Reference is therefore to be had to the appended claims for a definition of the limits of the invention.

What is claimed is:

1. In ammunition supply apparatus for rotatable twin gun mounts of the type including a fixed central hoist for delivering ammunition for both guns to a point between the guns, the combination of a plurality of members for receiving and retaining the ammunition delivered by said hoist, a frame mounted above said hoist for swivelling movement about the axis of the latter, means carried by said frame for supporting said members in normally vertical, closely adjacent positions, and means for moving said members outwardly away from one another parallel to themselves to positions outside the confines of said frame and then tilting said members relatively to said frame about an axis coplanar with the trunnion axes of the guns, the distance between said guns being such that said members may be moved to their outward separated positions without hindrance before tilting to bring them into position for transfer of the ammunition carried thereby to the loading mechanism of the guns.

2. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, and means for mounting said ammunition receiving members on said support for movement parallel to themselves toward and away from one another, the distance between said guns being such that said members may be moved to their outward separated positions without hindrance before said support is tilted about its axis on said frame to bring said members into position for transfer of the ammunition carried thereby to the loading mechanism of the guns.

3. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about a horizontal axis coplanar with the trunnion axes of said guns, means for mounting said ammunition receiving members on said support for movement parallel to themselves toward and away from one another, said members lying in substantially vertical, closely adjacent positions when receiving ammunition from said hoist, and means for moving said members outwardly away from one another to positions outside the confines of said frame before said support is tilted about its axis on said frame to bring said members into position for transfer of the ammunition carried thereby to the loading mechanism of the guns.

4. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, means for mounting said ammunition receiving members on said support for movement parallel to themselves toward and away from one another, and common means for producing movement of said members toward and away from one another and movement of said support about its axis on said frame.

5. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, means for mounting said ammunition receiving members on said support for movement parallel to themselves toward and away from one another, and common means for producing movement of said members toward and away from one another and movement of said support about its axis on said frame, said last named means being so constructed and arranged that movement of said support about its axis on said frame is prevented until said ammunition receiving members have been moved to their outward separated positions.

6. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, means for mounting said ammunition receiving members on said support for movement parallel to themselves toward and away from one another, means for moving said members toward and away from one another, means for moving said support about its axis on said frame, and means for preventing movement of said support about its axis on said frame until said members have been moved to their outward separated positions.

7. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, means for mounting said ammunition receiving members on said support for movement toward and away from one another about parallel axes, a lever pivotally mounted on said support, and means for converting actuation of said lever into successive movements of said members and said support about their respective axes.

8. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, means for mounting said ammunition receiving members on said support for movement toward and away from one another about parallel axes, a lever pivotally mounted on said support, means for converting actuation of said lever into successive movements of said members and said support about their respective axes, and means for locking said support against movement about its axis until said members have been moved to their outward separated positions.

9. In ammunition supply apparatus for rotatable twin gun mounts of the type including a fixed central hoist for delivering ammunition for both guns to a point between the guns, the combination of a plurality of members for receiving and retaining the ammunition delivered by said hoist, a support for said members, a frame mounted above said hoist for swivelling movement about the axis of the latter, said support being mounted on said frame for movement about an axis coplanar with the trunnion axes of said guns, means for mounting said ammunition receiving members on said support for movement toward and away from one another about parallel axes, a lever pivotally mounted on said support, means for converting actuation of said lever into successive movements of said members and said support about their respective axes, and means including a bolt adapted to be engaged in a recess formed in a portion of said frame for normally locking said support against movement about its axis, said bolt being withdrawn from said recess by actuation of said lever only when said members have been moved to their outward separated positions.

10. In ammunition supply apparatus for rotatable twin gun mounts of the type including a fixed central hoist for delivering ammunition for both guns to a point between the guns, the combination of a plurality of substantially tubular socket members for receiving and retaining the ammunition delivered by said hoist, a support for said socket members, said members being mounted on said support in normally vertical positions for movement toward and away from one another about axes parallel to the axes of said members, a frame mounted above said hoist for swivelling movement about the axis of the latter, means for mounting said support on said frame for movement about a horizontal axis, a lever pivotally mounted on said support, and means including a rack and pinion mechanism for converting movement of said lever about its pivot into movement of said socket members about their axes relative to said support, continued actuation of said lever after said socket members have been moved to their outward separated positions serving to tilt said support and members about said horizontal axis to bring said members into position for transfer of the ammunition carried thereby to the loading mechanism of the guns.

11. In ammunition supply apparatus for rotatable twin gun mounts of the type including a fixed central hoist for delivering ammunition for both guns to a point between the guns, the combination of a plurality of substantially tubular socket members for receiving and retaining the ammunition delivered by said hoist, a support for said socket members, said members being mounted on said support in normally vertical positions for movement toward and away from one another about axes parallel to the axes of said members, a frame mounted above said hoist for swivelling movement about the axis of the latter, means for mounting said support on said frame for movement about a horizontal axis, a lever pivotally mounted on said support, means including a rack and pinion mechanism for converting movement of said lever about its pivot into movement of said socket members about their axes relative to said support, continued actuation of said lever after said socket members have been moved to their outward separated positions serving to tilt said support and members about said horizontal axis to bring said members into position for transfer of the ammunition carried thereby to the loading mechanism of the guns, and means for preventing said tilting movement of said support and members until said members have been moved to their outward separated positions.

12. In ammunition supply apparatus for rotatable twin gun mounts of the type including a fixed central hoist for delivering ammunition for both guns to a point between the guns, the combination of a plurality of substantially tubular socket members for receiving and retaining the ammunition delivered by said hoist, a support for said socket members, said members being mounted on said support in normally vertical positions for movement toward and away from one another about axes parallel to the axes of said members, a frame mounted above said hoist for swivelling movement about the axis of the latter, means for mounting said support on said frame for movement about a horizontal axis, a lever pivotally mounted on said support, means including a rack and pinion mechanism for converting movement of said lever about its pivot into movement of said socket members about their axes relative to said support, continued actuation of said lever after said socket members have been moved to their outward separated positions serving to tilt said support and members about said horizontal axis to bring said members into position for transfer of the ammunition carried thereby to the loading mechanism of the guns, and a bolt operatively connected with said lever and normally engaged in a recess formed in a member fixed with respect to said frame so as to lock said support against movement relative to said frame, movement of said lever about its pivot withdrawing said bolt from its recess and freeing said support for tilting movement relatively to said frame only when said socket members have been moved to their outward separated positions.

LÉON DAUM.